March 22, 1966  C. T. PETERSEN ETAL  3,241,586
FREESTONE DRUPE PITTER
Filed Sept. 10, 1963  2 Sheets-Sheet 1
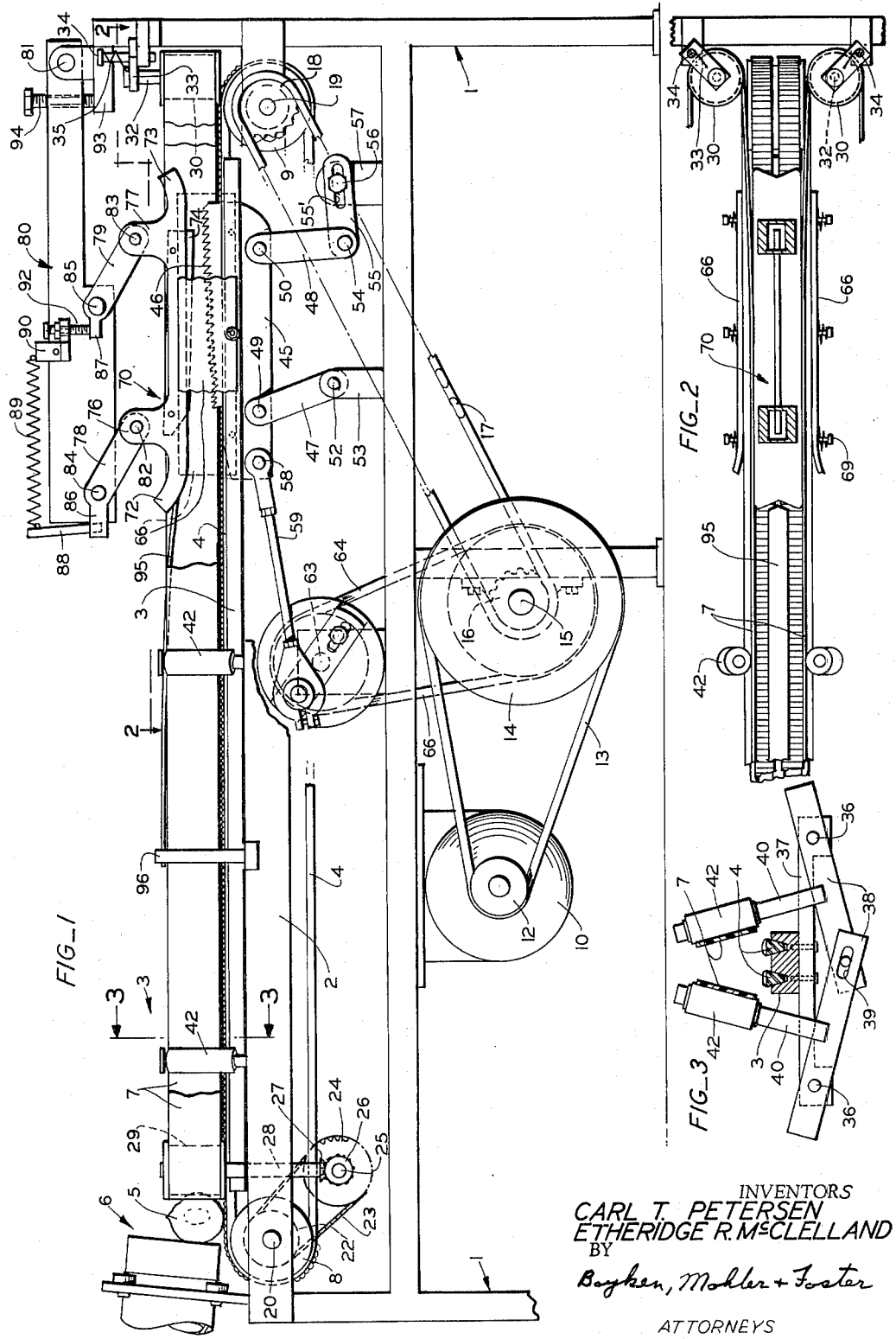
INVENTORS
CARL T. PETERSEN
ETHERIDGE R. McCLELLAND
BY
Boyken, Mohler + Foster
ATTORNEYS

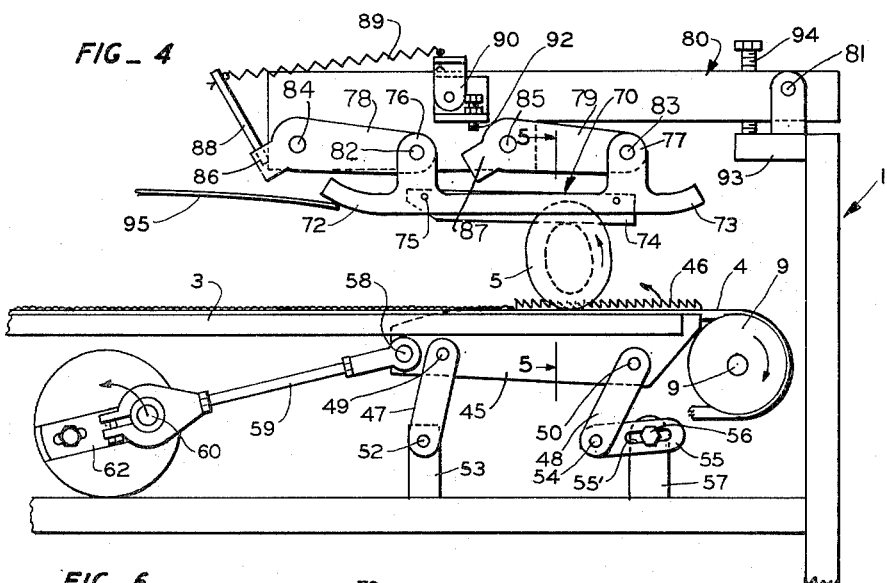
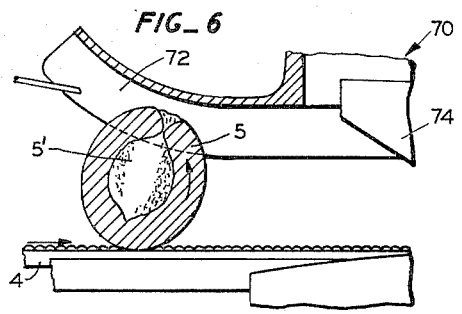
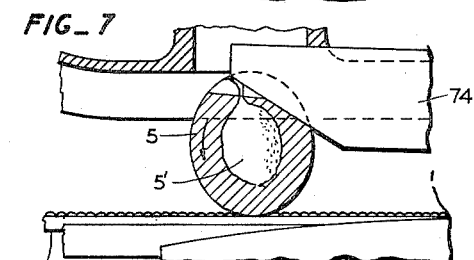
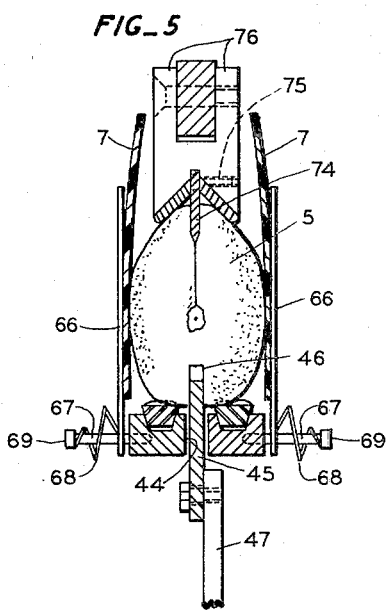
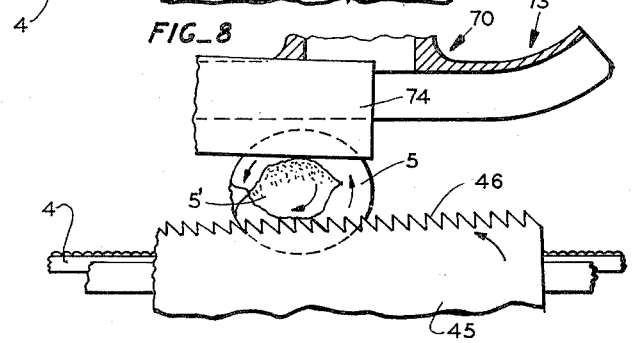

United States Patent Office 3,241,586
Patented Mar. 22, 1966

3,241,586
FREESTONE DRUPE PITTER
Carl T. Petersen, Lafayette, and Etheridge R. McClelland, Hayward, Calif., assignors to Filper Corporation, San Ramon, Calif., a corporation of California
Filed Sept. 10, 1963, Ser. No. 307,898
8 Claims. (Cl. 146—28)

This invention relates to a drupe pitter of generally the type shown in copending application Serial No. 272,253, filed April 11, 1963, of Etheridge R. McClelland and George E. Kilner, now Patent No. 3,194,290.

One of the objects of this invention is the provision of improved means of bisecting and pitting freestone drupes, such as apricots.

In many instances, once the bodies of apricots have been bisected to the pit, the pits will readily separate therefrom. However, with certain varieties, and by reason of climatic conditions during the formation of apricots of different varieties, the pits will many times cling in the pit cavities or to one or the other of the halves.

One of the objects of this invention is the provision of means that will insure separation of the bisected fruit bodies of apricots and the like from the pits, irrespective of the tenacity with which the pits cling to the bisected fruit bodies.

Another object of the invention is the provision of means for bisecting apricots and for completely separating the pits from the flesh or meat of the apricots without injury to the flesh or meat, and which means is adapted to perform the bisecting and pitting operations at a high rate of speed, whereby a high volumn of fruit per hour will be bisected and pitted more efficiently than heretofore.

Other objects and advantages will appear in the description and in the drawings.

In the drawings:

FIG. 1 is a side plan view, partly broken away, showing a machine embodying the invention.

FIG. 2 is a fragmentary, cross-sectional view, taken along line 2—2 of FIG. 1.

FIG. 3 is an enlarged, fragmentary, cross-sectional view taken along line 3—3 of FIG. 1.

FIG. 4 is an enlarged, fragmentary, side elevational view of the pitting mechanism that is adjacent to the right hand end of FIG. 1, illustrating the mechanism with a drupe positioned therein.

FIG. 5 is an enlarged cross-sectional view taken substantially along the line 5—5 of FIG. 4.

FIG. 6 is a fragmentary, enlarged, cross-sectional view showing an apricot in a position at the commencement of the bisecting operation.

FIG. 7 is a view similar to that of FIG. 6 but showing the apricot farther advanced than in FIG. 6.

FIG. 8 is similar to FIGS. 6, 7 with the apricot in the pitting operation slightly farther advanced to a position generally corresponding to that of FIG. 4.

The machine illustrated in the drawings comprises a frame 1 having parallel horizontally elongated side frame members 2, and extending between said side frame members are end and cross frame members, all being a part of frame 1, which frame carries a stationary, horizontally elongated belt support 3 (FIG. 3). Support 3 is formed with a pair of horizontally spaced, parallel, upwardly opening grooves extending longitudinally of the support. The upper runs of a horizontally extending pair of endless V-belts 4 are slidably supported in said grooves with the apices of the belts disposed in said grooves, and with the base surfaces opposite to said apices being formed with a relatively soft roughened, horizontally disposed surface, such as produced by ridges or the like for carrying drupes 5 from left to right as seen in FIG. 1, and to insure rotation of said drupes as they are so carried.

The drupes may be referred to hereinafter as apricots, inasmuch as the machine is primarily used for bisecting and pitting apricots, although it is to be understood that the use of the invention is not necessarily limited to apricots. Also, hereinafter the use of the word "frame" refers to any rigid part of the frame, including the side frame members 2, where applicable.

The apricots 5 (FIG. 1) are fed onto the feed end of belts 4, which is the left hand end of the machine as viewed in FIG. 1, by any suitable single-line feeding means, such as is generally designated 6, and at said feed end they pass between the adjacent horizontally extending, horizontally spaced opposed runs of a pair of endless belts 7 that are parallel with belts 4. The belts 7 are generally vertical transversely of their lengths, and extend upwardly from approximately the upper level of the belts 4 (FIG. 5).

Belts 4 respectively extend over a pulley 8 at the feed end of the machine and over a pulley 9 at the discharge end, the latter being at the right hand end of the machine of FIG. 1. The said belts 4 and belts 7 are driven by a motor 10 so that the upper runs of said belts and the adjacent runs of belts 7 will move in the same direction from left to right as seen in FIG. 1 with the belts 7 being normally moved at a slower rate of speed than the belts 4, so that the apricots supported on belts 4 will rotate counterclockwise about their respective horizontal axes as they are carried by belts 4 from the feed to the discharge end of the machine (FIG. 6).

Motor pulley 12 is connected by a belt 13 with a pulley 14 that, in turn, is secured on a shaft 15 (FIG. 1). Shaft 15 is journalled for rotation in bearings carried by frame 1, and said shaft has a sprocket wheel 16 secured thereto, which sprocket wheel is connected by a chain 17 with a sprocket wheel 18. The sprocket wheel 18 is secured on a shaft 19 that is at the discharge end of the machine, and shaft 19 is journalled for rotation in bearings carried by the frame 1. Pulley 9 is also secured on shaft 19.

Pulley 8, which is at the feed end of the machine, is secured on a shaft 20, which shaft is journalled for rotation in bearings on frame. 1. A sprocket wheel 22 is also secured on shaft 20. This wheel is connected by a sprocket chain 23 with a sprocket wheel 24, the latter being secured on a shaft 25 that is rotatable in bearings on frame 1. Shaft 25 has a pair of opposed bevel gears 26 secured thereto, which gears have their teeth in mesh with the teeth of a corresponding pair of bevel gears 27, respectively secured on the lower ends of a pair of vertically extending pulley shafts 28, the latter being rotatably supported in bearings carried by frame 1. Pulleys 29 are secured on the upper ends of shafts 28 at the feed end of the machine, and belts 7 extend around said pulleys, while belts 4 extend over pulley 8.

Pulleys 30 at the discharge end of the machine (FIG. 2) support the belts 7 at their ends opposite to the feed end, which pulleys 30 are rotatable on vertically disposed shafts 32, the latter depending from one of the ends of horizontally disposed arms 33. The opposite ends of arms 33 are pivotally supported by pivots 34, and a torsion spring 35 about each pivot (FIG. 1) is secured at one end to each arm for yieldably swinging the ends carrying the pulley shafts 32 in a direction away from pulleys 29 to maintain belts 7 relatively taut (FIGS. 1, 2). Pivots 34 are supported on frame 1.

Pivots 36 (FIG. 3) are carried by cross members 37 that, in turn, are rigid on frame 1 and these pivots swingably support one of the ends of a pair of equalizer links 38, which links, in turn, are connected at one of their ends by a pin-slot connection 39, so that the links will swing simultaneously and to equal degrees relative to spaced pivots 36 when either of the arms is swung. Pivots 36 are outwardly of opposite sides of the pairs of belts 4, and the pin-slot connection between the adjacent ends of each pair of arms is centrally below the pair of belts 4. Generally vertically extending shafts 40 rotatably support rollers 42 at their upper ends, which rollers engage the opposite outer sides of the adjacent runs of belts 7, and the positions of these rollers are such that they will cause the said runs of belts 7 to extend convergently upwardly, transversely of their lengths, so as to yieldably engage the apricots 5 at opposite sides thereof at points above their horizontal axes.

The rollers 42 are preferably positioned to effect the above-described transverse inclination of the belts from a point adjacent to the feed end of the machine to a point adjacent to the bisecting and pitting mechanism, and by this arrangement, the apricots will not only be held downwardly on belts 4 but will be oriented so their sutures will be vertical and in a plane parallel with the belts 4 and substantially midway between said belts. It is pertinent to note that pulleys 29 are spaced apart a sufficient distance to enable the largest size fruit to pass between them, and rollers 42 urge the belts closer together to insure the desired engagement between the belts and the fruit.

BISECTING AND PITTING MECHANISM (Lower part)

With the exception of the pair of conveyor belts 4, the structure hereinbefore described, in itself, is old, except for minor variations.

The bisecting and pitting mechanism is supported on a frame and is positioned between the pairs of pulleys 8, 9, but adjacent to pulley 9. While pulley 8 and pulley 9 have been referred to as singular, they may obviously be in pairs, inasmuch as they rotate together on shafts 20, 19. The bisecting and pitting mechanism is in two parts: an upper part that is above the belts 4 and a lower part that is below and that extends upwardly between belts 4. Also the lower part includes elements that extend upwardly at opposite outer sides of the pair of belts 4 and 7, as will be later be described more in detail.

The belt support 3 is divided, longitudinally thereof at the pitting and bisecting mechanism, to provide a longitudinally extending slot 44 (FIG. 5) through which a vertically disposed, horizontally elongated blade 45 extends from below the belts 4, upwardly between them to a level above the latter, which blade extends longitudinally of said slot.

Blade 45 is formed along its upper edge with square, unset saw teeth 46, the sharp upper edges of which are preferably directed generally against the direction of travel of the body of each apricot 5 (FIG. 8) and to the direction of rotation of the pit 5' in each apricot. The thickness of blade 45 is exaggerated in FIG. 5, as is belt 7, the latter being preferably of plastic and relatively thin.

Blade 45 is supported vertically on the upper ends of a pair of links 47, 48 (FIG. 4). These links are not parallel, and the upper end of link 47, which is nearest the feed end of the machine, is connected with blade 45 by a horizontal pivot 49 while the upper end of link 48 is connected with said blade by a pivot 50. Pivots 49, 50 are relatively widely spaced apart longitudinally of the blade and are respectively adjacent to opposite ends of the blade. The lower end of link 47 is connected by a horizontal pivot 52 with a bracket 53 rigid on frame 1, while the lower end of link 48 is connected by pivot 54 with one end of an adjustable arm 55 that is adjustably secured by a bolt 56 to a bracket 57 that is rigid on the frame of the machine. Arm 55 extends from bolt 56 toward the link 47 that is at the end of the blade nearest the feed end of the machine, and the angle of arm 55 as well as the distance it projects from bracket 57 may be adjusted, since bolt 56 extends through a slot 55' in arm 55, said slot extending longitudinally of arm 55.

The end of blade 45 that is nearest to the feed end of the machine is connected by a pivot 58 with one end of a connecting rod 59, and the other end of said rod is connected with a crank pin 60 of an adjustable crank arm 62 that, in turn, is secured to the other end of a shaft 63 (FIG. 1). Shaft 63 carries a pulley that is connected by a belt 64 with a pulley on shaft 15.

The upper edge of the end of the blade 45 that is adjacent to the feed end of the machine is preferably below the upper level of belts 4, while the row of teeth may project above the upper level of the belts, as will be explained.

In operation, referring to FIG. 4, the blade 45 is shown at the extreme end of its stroke in the direction toward the discharge end of the machine. The row of teeth may be substantially horizontal. Also, due to the arrangement of links 47, 48, when the connecting rod 59 is in the position shown in FIG. 4, the row of teeth 46 may be almost horizontal and adjacent to the upper level of the belts 4. The link 47 is slightly inclined in an upward direction from pivot 52 toward the discharge end of the machine and link 48 has a similar but substantially greater inclination in the same direction. As a result, when the crank 62 is revolved in the direction of the arrow (FIG. 4) the blade will be moved toward the feed end of the machine and opposite to the direction of movement of the apricots, and at the same time the blade 45 will move upwardly and will rock so that the end of the row of teeth adjacent to the discharge end of the machine will be substantially higher than the end of the blade that is nearest to the feed end of the machine (FIG. 1). The row of teeth will have a raking action and will positively engage the pit that is in the drupe and will cause a relative movement between the pit and the flesh by rotating the pit in a direction opposite to the direction of rotation of the flesh. This reciprocatory and rocking movement of blade 45 is preferably quite rapid relative to the movement of the conveyor belt 4, and, as already stated, the degree of elevation of the teeth 46 is such as to positively engage a pit in any apricot that is held against the belts 4 and that is moved along the blade.

The lower part of the bisecting and pitting mechanism also includes a pair of horizontally extending, vertically disposed side plates 66 (FIGS. 1, 2, 5) that slidably engage the oppositely outwardly facing surfaces of the adjacent runs of belts 7 where the latter are at opposite sides of apricots 5. These plates are slidably supported along their lower edges on pins 67, and springs 68 react between heads 69 on said pins and the plates 66 to yieldably hold the plates against said belts and to yieldably hold the belts against the apricots. The latter have been oriented by the time they reach the bisecting and pitting mechanism, so that the sutures of the pits are in a vertical plane extending longitudinally of the machine and substantially midway between plates 66 and belts 7.

BISECTING AND PITTING ASSEMBLY (Upper part)

The upper part of the bisecting and pitting assembly comprises, for the most part, a horizontally extending, elongated hold-down member 70 that is of inverted V-shape in cross sectional contour, formed with upturned curved opposite end portions 72, 73 (FIGS. 1, 4). Member 70 is formed with a longitudinally extending central slot along the apex of its inverted V-shaped contour within which is fitted a horizontally elongated cutting blade 74 (FIGS. 4, 5) that is rigidly secured to said member in any suitable manner, such as by pins 75. The straight intermediate portion of the member 70 preferably extends substantially the full length of the blade 74. The lower cutting edge of blade 74 projects downwardly a sufficient distance to cut the body of an apricot at its upper side to substantially the pit, and the straight lower edge of blade 74 slants slightly downwardly in a direction toward the discharge end of the machine.

Two pairs of upstanding ears (FIG. 1) are integral with the hold-down member and project upwardly from its upper side, one pair 76 being adjacent to curved end 72, and the other pair 77 is adjacent to the opposite curved end 73, which end is nearest the discharge end of the machine. A pair of links 78, 79 swingably suspend the hold-down member 70 from a horizontally extending overhead support 80, one end of which support projects toward the discharge end of the machine where it is connected with the frame 1 by a horizontal pivot 81. One of the ends of the arm or link 78 is positioned between the pair of ears 76 and is connected with said ears by pivot 82 while the other link 79 is between and is pivotally connected with ears 77 by pivot 83.

Links or arms 78, 79 are parallel, extending generally toward the feed end of the machine, and upwardly from pivots 82, 83, and the upper ends of said links are respectively connected with support 80 by pivots 84, 85.

The words "forward," "forwardly," "rear" and "rearwardly" as used herein refer to the discharge and feed ends of the machine. Since the apricots move forwardly in the machine from the rear end, the forward end of the machine is the discharge end, and the rear end is the feed end.

The links 78, 79 thus project rearwardly, and on the rear end of each link is a horizontally extending projection, the one on link 78 being designated 86, and the one on link 79 being designated 87.

An upstanding lug or post 88 rigid on projection 86 is connected at its upper end by a helical spring 89 with a projection 90 that is rigid with the overhead support 80.

A vertically extending screw 92 threadedly extending through part of the rigid projection 90 is adapted to engage projection 87 to limit the downward movement of the hold-down member 70 under the influence of spring 89. Spring 89 will yieldably resist upward movement of the hold-down member 70, but permits such movement.

The rigid frame 1 to which the forward end of support 80 is pivoted includes a lateral projection 93. A vertically extending screw 94 threadedly extends downwardly through the support 80 adjacent to pivot 82, and said screw is located between said pivot and the portion of the overhead support carrying the hold-down member. This screw 94 engages the projection 93 to limit the bodily downward movement of the hold-down member, while upward bodily movement of said member is permitted, should sufficient upward force be exerted against the underside of the hold-down member. Screw 94 permits variation in the distance between the hold-down member and the belts 4 when the hold-down member is in its lowermost position, while the screw 92 enables varying the tension on spring 89. Of course the screw 92 also enables varying the distance between the hold-down member and belts 4, but the tension of spring 89 will be varied at the same time.

At the rear side of the hold-down member is a horizontally elongated leaf spring 95 that is secured at its rear end to an overhead, rigid cross member 96. This spring terminates in a free forward end at a point adjacent to the rear end of the hold-down (FIG. 2) and it inclines downwardly in a forward direction to slidably and yieldably engage the upper sides of the apricots at about the point where such apricots pass between the forward ends of plates 66 where belts 7 are approximately vertical. The apricots will freely pass below the rear end of the spring.

OPERATION

In operation the apricots are fed in single file and in substantially equally spaced relation onto the feed end of belts 4 which rapidly carries them to the right, as seen in FIG. 1, to the bisecting and pitting assembly. As the apricots are so carried on belts 4, they are rotated about their horizontal axes so that the lower sides of the apricots will move generally in the same direction as they are being carried, and their upper sides will move generally in the opposite direction. The engagement between the opposite sides of the apricots and belts 7 and the differential between the rate of movement of belts 7 and belts 4 causes the above-described rotation of the apricots and also effects orientation of the apricots so the sutures of their pits will be in a vertical plane parallel with and intermediate belts 4.

Upon the apricots reaching the feed end of the bisecting and pitting assembly, they will be oriented, and the sharpened edge of the overhead blade 74 will bisect the body to the pit by the time the apricot reaches the row of teeth 46. The inverted V-shaped hold-down 70 will center the apricot as well as urge it downwardly against belts 4, while the parallel vertically disposed belts 7, in cooperation with side plates 66, will insure against inaccurate and wasteful cutting of the body of the apricot by blade 74.

The teeth 46 of blade 45 will enter the cut formed by the cutting edge of blade 74, and the rate of the generally reciprocatory and oscillatory movement of blade 44 relative to the rate at which the apricots is carried by belts 4 is such that the teeth 46 will positively engage the lower edge of the pit after the body has been bisected, to rotate the pit in a direction opposite to the direction of rotation of the body (FIG. 8). The pit may be engaged several times by the teeth 46 to effect this result before the body of the apricot leaves the pitting and bisecting assembly, thereby completely forcing the pit from the meat or body of the apricot.

FIGS. 6, 7 are illustrative of the progressive movement of the apricot as it enters the bisecting and pitting mechanism.

FIG. 8 shows the bisected body at the time teeth 46 engage the pit 5'.

The movement of belts 7 in the same direction as belts 4 is not always necessary, since belts 4 would cooperate with belts 7 to effect the rotation of the apricots if they were stationary. However it is preferable.

The present invention is directed more to the bisecting and pitting assembly in cooperation with belts 4 and 7, to thereby eliminate circular cutting blades and the problems of feeding apricots to such blades. Also the present invention positively assures separating the bisected bodies from the pits without mutilating the bodies, and the desired results are accomplished at a high rate of speed.

After the halves and pits are completely separated from each other and leave the bisecting and pitting assembly they will be carried off the discharge end of the machine and the freed pits may readily be removed from the fruit halves, it being understood that the pits are completely free from the halves at this time.

The machine illustrated shows a machine for handling one file of apricots. It is obvious that a plurality of sets of belts and bisecting and pitting assemblies may be incorporated in a machine and operated simultaneously from a single source of power, which is the practice in many commercial installations.

While a preferred form of the invention is shown and described, it is to be understood that changes in details of construction can be made without departing from the invention within the scope of the appended claims, and in connection with such possible modification, the teeth 46 on blade 45 may be of inverted V-outline or slanted oppositely to the direction shown in FIG. 8. In either case, the reciprocation of the blade is so rapid that positive relative rotation between the pit and the body of the fruit would be effected, whether such rotation of the pit were in the same direction as the rotation of the body or in the opposite direction.

We claim:
1. In a drupe pitting machine:
 (a) a pair of parallel, horizontally extending conveyor belts in spaced side-by-side relation having upper runs adapted to support a drupe thereon for carrying said drupe longitudinally thereof upon movement of said upper runs in one direction;
(b) means connected with said belts for moving said upper runs in said one direction at a predetermined rate of speed;
(c) a vertically disposed blade having an upper edge formed with a row of upwardly directed teeth;
(d) means supporting said blade in a position between said upper runs with said row of teeth extending generally longitudinally of said pair of belts, and for rocking movement of said blade to alternate positions in which one end of said row of teeth in said one direction is elevated and lowered relative to the opposite end of said row for engaging a pit within a drupe supported on said belts above said row of teeth;
(e) means connected with said blade for so rocking the latter.

2. In a drupe pitting machine as defined in claim 1:
(f) said means supporting said blade also supporting said blade for reciprocatory movement longitudinally of said belts in which said blade will be moved in a direction opposite to the direction of movement of said belts when said one end of said row is in elevated position.

3. A drupe pitting machine, comprising:
(a) conveyor means on which a drupe is adapted to be supported and carried in one direction upon movement of said conveyor means in one direction;
(b) conveyor actuating means connected with said conveyor means for moving the latter in said one direction;
(c) pit engaging means having projections thereon adapted to extend into the body of said drupe and to engage one side of the pit within said body;
(d) means supporting said pit engaging means adjacent to said path and in a position to engage said one side of said pit at a point along said path upon movement of said drupe by said conveyor means in said one direction for generally reciprocatory movement of the latter when said projections thereon are in said engagement with said pit and during said movement of said drupe along said path to effect relative movement between the body of said drupe around said pit and said pit;
(e) means connected with said pit engaging means for effecting said generally reciprocatory movement thereof;
(f) a cutting blade spaced above said pit engaging means for cutting said drupe to the pit therein to bisect the flesh of the drupe to the pit; and
(g) means positioning and supporting said blade in the same plane with said blade adapted to engage and to so bisect said flesh to said pit in advance of said pit being engaged by said pit engaging means.

4. A drupe pitting machine, comprising:
(a) conveyor means on which a drupe is adapted to be supported and carried in one direction upon movement of said conveyor means in one direction;
(b) conveyor actuating means connected with said conveyor means for moving the latter in said one direction;
(c) pit engaging means having projections thereon adapted to extend into the body of said drupe and to engage one side of the pit within said body;
(d) means supporting said pit engaging means adjacent to said path and in a position to engage said one side of said pit at a point along said path upon movement of said drupe by said conveyor means in said one direction for generally reciprocatory movement of the latter when said projections thereon are in said engagement with said pit and during said movement of said drupe along said path to effect relative movement between the body of said drupe around said pit and said pit;
(e) means connected with said pit engaging means for effecting said generally reciprocatory movement thereof;
(f) said pit engaging means comprising a blade, and said projecting means being a row of teeth along one edge of said blade;
(g) said means supporting said pit engaging means including elements rockingly supporting said blade for moving said teeth toward and away from a pit in a drupe at said point for intermittently moving said teeth into said engagement with said pit.

5. In a drupe pitting machine:
(a) a drupe support for a drupe to be pitted including drupe engaging means adapted to engage opposite sides of said drupe whereby said drupe will be between said means;
(b) a pit engaging means including an element adapted to extend into a drupe held between said means, which element has a pointed tooth adapted to engage the outer side of the pit within said drupe;
(c) means connected with said pit engaging means for causing generally reciprocatory movement of said pointed tooth while the latter is in engagement with the outer side of said pit thereby tending to move said pit relative to the body of the drupe around said pit;
(d) means supporting said drupe engaging means in positions for engaging the upper and lower sides of said drupe, respectively;
(e) said drupe engaging means including a cutting blade adapted to cut the body of the drupe between said drupe engaging means at the upper side of said drupe to the pit;
(f) means supporting said pit engaging means in a position for engaging said pit after said body has been cut by said cutting blade to said pit;
(g) the lower of said drupe engaging means that is adapted to engage the lower side of said drupe being movable in one direction to a position for carrying said drupe to said pit engaging means after said body has been cut by said cutting blade to said pit for engagement of said pit by said pit engaging means;
(h) and means connected with said pit engaging means for moving the latter in a direction opposite to said last mentioned one direction when said pit engaging means is in engagement with said pit.

6. In a drupe pitting machine:
(a) a horizontally extending, horizontally elongated drupe support for supporting a whole drupe to be pitted thereon;
(b) an overhead hold-down member for holding said drupe on said drupe support;
(c) a stationary frame carrying said drupe support;
(d) hold-down supporting means supporting said hold-down member on said frame for bodily upward movement of said hold-down member away from said drupe support whereby said hold-down member will be adapted to move bodily upward under a predetermined upward force thereagainst by an object on said drupe support;
(e) hold-down connecting means connecting said hold-down member with said hold-down supporting means for bodily movement of said hold-down member therewith and for movement of said hold-down member upwardly relative to said hold-down supporting means under a predetermined upward force that is less than said first mentioned predetermined upward force;
(f) means supporting said drupe support for movement longitudinally thereof in one direction along a horizontally extending path of travel;
(g) means connected with said drupe support for moving it in said one direction;

(h) said hold-down supporting means including an element spaced above said drupe support extending longitudinally of the latter and a pivot connecting one end thereof with said frame for upward swinging of said element relative to said drupe support from said one end of said element;

(i) said hold-down connecting means comprising parallel links pivotally suspending said hold-down member from said element for upward movement of the latter relative to said element; and (j) yieldable means connecting said links with said element for yieldably urging said hold-down member downwardly and for yieldable resisting upward movement of said hold-down member.

7. In a machine for pitting drupes having sutures, the combination comprising:

(a) a horizontally extending conveyor on which a drupe is adpated to be supported for movement in one direction longitudinally thereof in a horizontally extending path of travel, and means connected with said conveyor for moving it in said one direction for carrying said drupe along said path;

(b) a pair of horizontally spaced, horizontally elongated, generally vertically disposed strips in a position extending longitudinally of said conveyor at opposite sides of said path, and means connected with said strips for supporting them in said position in frictional engagement with opposite sides of a drupe on said belt for supporting said drupe with its suture in a substantially vertical plane bisecting said path longitudinally of the latter;

(c) an overhead, horizontally elongated, hold-down device of inverted V-shape transversely of its length in an overhead position over and parallel with said path for engagement with the upper portion of a drupe on said conveyor for centering said drupe in said path, the apex of said V-shape being substantially in said vertical plane, and means for supporting said device in said overhead position in yieldable engagement with said drupe;

(d) an upper and a lower vertically spaced, horizontally elongated blade disposed vertically in said plane along the upper and lower sides of said path respectively projecting downwardly from said hold-down device, and upwardly above said conveyor in drupe cutting and pit engaging relation for respectively bisecting said drupe in said plane to the pit thereof and for engaging said pit in said plane; and (e) means connected with said lower blade for reciprocating it longitudinally thereof when in said engagement with said pit.

8. In the combination as defined in claim 7:

(f) said strips comprising the opposed adjacent runs of a pair of endless belts, said runs having their oppositely facing surfaces facing said path for said engagement with a drupe in said path, and means connected with said belts for moving said runs in the same direction as the direction of movement of said conveyor;

(g) means yieldably engaging said runs at the sides thereof opposite to said opposedly facing surfaces for yieldably holding said surfaces in engagement with the opposite sides of such drupe during said movement of the latter along said path.

References Cited by the Examiner
UNITED STATES PATENTS

| | | | |
|---|---|---|---|
| 1,448,532 | 3/1923 | Harding | 146—47 |
| 2,735,466 | 2/1956 | Krstinich | 146—28 X |
| 3,035,620 | 5/1962 | Drake et al. | 146—28 |
| 3,093,173 | 6/1963 | Hait | 146—28 |
| 3,102,568 | 9/1963 | Hait | 146—238 |
| 3,151,646 | 10/1964 | Drake et al. | 146—238 |

FOREIGN PATENTS 222,927   7/1959   Australia.

ROBERT C. RIORDON, *Primary Examiner.*

J. SPENCER OVERHOLSER, *Examiner.*